(12) United States Patent
Shigemori et al.

(10) Patent No.: US 9,102,022 B2
(45) Date of Patent: Aug. 11, 2015

(54) PARTS ASSEMBLY SYSTEM (75) Inventors: Takashi Shigemori, Kawasaki (JP); Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 433 days.

(21) Appl. No.: 13/277,279

(22) Filed: Oct. 20, 2011

(65) Prior Publication Data

US 2012/0123585 A1 May 17, 2012

(30) Foreign Application Priority Data

Nov. 15, 2010 (JP) ................................. 2010-254482

(51) Int. Cl.
*B23P 21/00* (2006.01)
*G05B 19/418* (2006.01)

(52) U.S. Cl.
CPC ......... *B23P 21/004* (2013.01); *G05B 19/41815* (2013.01)

(58) Field of Classification Search
None
See application file for complete search history.

(56) References Cited

U.S. PATENT DOCUMENTS

| | | | | |
|---|---|---|---|---|
| 4,719,694 A * | 1/1988 | Herberich et al. | ............... | 29/703 |
| 5,125,149 A * | 6/1992 | Inaba et al. | ...................... | 29/430 |
| 5,353,495 A * | 10/1994 | Terabayashi et al. | ........... | 29/714 |
| 5,536,128 A * | 7/1996 | Shimoyashiro et al. | ...... | 414/273 |
| 6,089,811 A * | 7/2000 | Watanabe et al. | ............. | 414/269 |
| 6,256,868 B1 * | 7/2001 | Sugito et al. | .................... | 29/711 |
| 6,336,546 B1 * | 1/2002 | Lorenz | ........................ | 198/346.2 |
| 6,457,231 B1 * | 10/2002 | Carter et al. | .................... | 29/791 |
| 6,516,234 B2 * | 2/2003 | Kamiguchi et al. | ........... | 700/20 |
| 6,670,568 B2 * | 12/2003 | Goetzke | ........................ | 209/567 |
| 6,721,627 B2 * | 4/2004 | Udou et al. | ................... | 700/228 |
| 6,722,010 B2 | 4/2004 | Maruyama et al. | | |
| 6,733,243 B2 * | 5/2004 | Ogata et al. | .................... | 414/217 |
| 6,745,102 B1 * | 6/2004 | Liu | ............................... | 700/228 |
| 6,845,294 B2 * | 1/2005 | Jevtic et al. | .................... | 700/228 |
| 7,086,518 B1 * | 8/2006 | Hranica et al. | ........... | 198/341.03 |
| 7,096,091 B2 * | 8/2006 | Haas et al. | ..................... | 700/245 |
| 7,398,850 B2 * | 7/2008 | Koide | ............................ | 180/168 |
| 7,624,614 B2 * | 12/2009 | Heid et al. | ................. | 72/405.16 |
| 8,000,837 B2 * | 8/2011 | Allen et al. | .................... | 700/245 |
| 8,340,835 B2 * | 12/2012 | Takayama | ..................... | 700/304 |
| 8,425,173 B2 * | 4/2013 | Lert et al. | ....................... | 414/280 |
| 2005/0191162 A1 * | 9/2005 | Chang et al. | ................... | 414/626 |
| 2006/0016720 A1 * | 1/2006 | Naito | ............................ | 206/725 |
| 2008/0080963 A1 * | 4/2008 | Bufano et al. | ................ | 414/788 |
| 2008/0104818 A1 * | 5/2008 | Taniguchi et al. | .............. | 29/428 |
| 2009/0030542 A1 * | 1/2009 | Lindstrom et al. | ............ | 700/113 |
| 2011/0154654 A1 * | 6/2011 | Cardani et al. | ................. | 29/795 |

FOREIGN PATENT DOCUMENTS

| | | | |
|---|---|---|---|
| JP | 2978028 B | 10/1994 | |
| JP | 2001-277055 A | 10/2001 | |

* cited by examiner

*Primary Examiner* — Ryan Jarrett (74) *Attorney, Agent, or Firm* — Fitzpatrick, Cella, Harper & Scinto (57) ABSTRACT

In a parts assembly system which assembled subsidiary parts with main parts, the main parts are conveyed through a first conveying path to an assembly robot provided along the first conveying path, and the subsidiary parts are supplied through the first conveying path to stockers provided along the first conveying path. In consequence, the travel space of the conveying cart is saved.

9 Claims, 9 Drawing Sheets

PARTS ASSEMBLY SYSTEM

BACKGROUND OF THE INVENTION

1. Field of the Invention

The present invention relates to a parts assembly system provided in an automatic production line for plastic products and the like.

2. Description of the Related Art

In recent years, in a production line using an automatic machine, not only assembly of parts but also supplement of parts to each assembly station is automated. Typical techniques for the automation of the parts supplement are automatic guided vehicles (AGV), in which self-propelled conveying carts travel in accordance with a predetermined drive program.

However, the method in accordance with the drive program has a disadvantage that the system becomes complicated as the scale of the line and the number of the conveying carts increase. In this regard, a system has been suggested in which a request for the supplement is made from each assembly station, and the request is received to perform the supplement, without using the drive program (refer to Japanese Patent No. 2978028).

Figure 9:
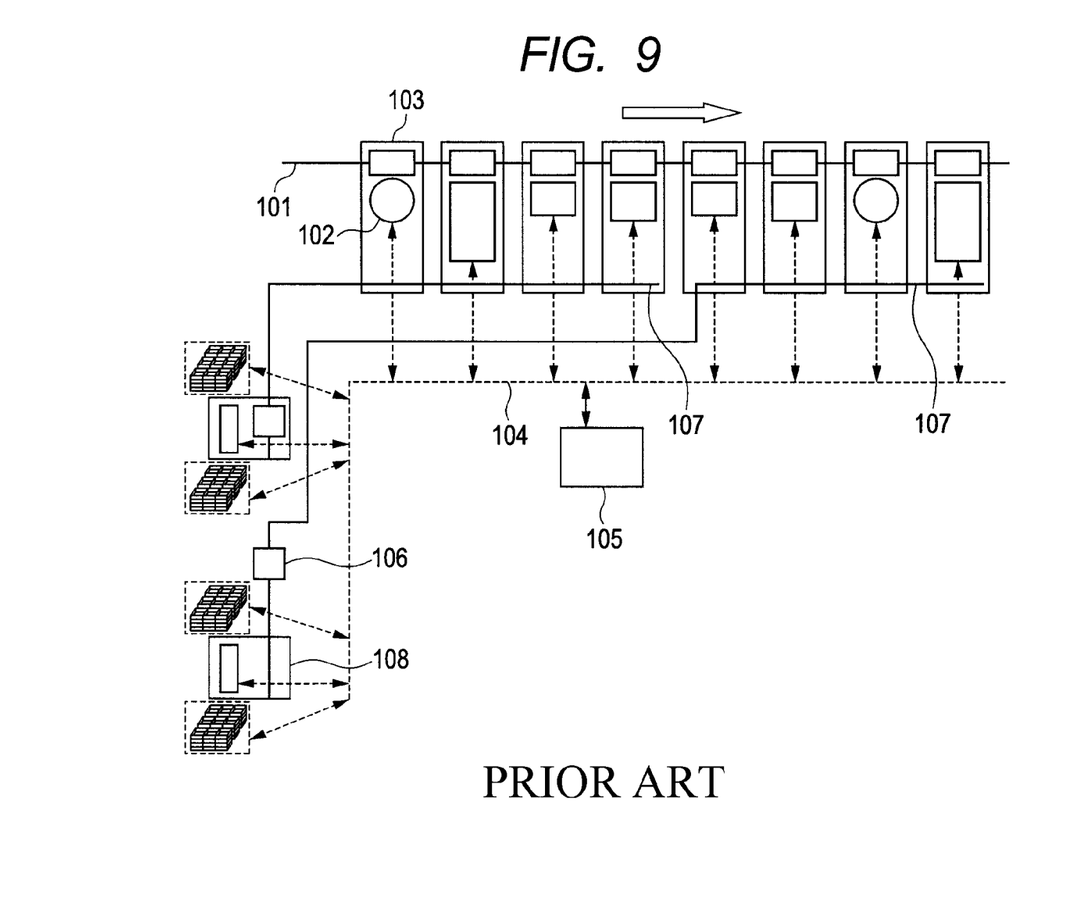
FIG. 9 is an exemplary diagram illustrating a conventional example.

FIG. 9 schematically illustrates this system, which includes a production line 101 where main parts to be assembled are conveyed, a plurality of assembly stations 103 including a stocker 102 of subsidiary parts, and a remain information network 104 which notifies remain information of the stocker 102. On receiving the request for the supplement from each of the assembly stations 103, a control device 105 controls a self-propelled conveying cart 106 which supplies subsidiary parts. In a conveying path 107 of the self-propelled conveying cart 106, a parts placing station 108 for placing parts into the self-propelled conveying cart 106 is provided.

In this parts supply system, when supplement of parts is necessary in the stocker 102, the assembly station 103 issues a parts supplement request to the control device 105 through the remain information network 104. The control device 105 allows the self-propelled conveying cart 106 to travel along the conveying path 107 to supplement the parts in order of requests being received. The supplemented parts are placed into the parts placing station 108 and conveyed to each assembly station.

However, in such a parts supply system, the stocker of the parts supply machine provided in the assembly station necessarily faces the conveying path of the subsidiary parts, and the width of the stocker necessary in the assembly station is different depending on the subsidiary parts. For this reason, if the assembly station is narrow, the subsidiary parts cannot directly be conveyed to the stocker, and it is necessary to manually move the parts in part or prepare a separate conveyor. In addition to the production line, it is necessary to provide the space for the travel of the self-propelled conveying cart across the total length of the production line.

SUMMARY OF THE INVENTION

An object of the present invention is to provide a parts assembly system which saves a travel space of a conveying cart and promotes miniaturization and cost reduction of the whole apparatus.

According to the present invention, there is provided a parts assembly system which assembles subsidiary parts with main parts, including: a first conveying path through which the main parts and the subsidiary parts are conveyed; a plurality of assembly stations arranged along the first conveying path, each of the assembly stations being provided with an assembly robot and a stocker; a main parts supply unit which supplies the main parts through the first conveying path; a subsidiary parts supply unit which supplies the subsidiary parts through the first conveying path; a transfer unit which transfers, to the stocker, the subsidiary parts conveyed to each of the assembly stations through the first conveying path; and an operation information processing device which controls operations of the respective assembly stations, the main parts supply unit, and the subsidiary parts supply unit, wherein the subsidiary parts are supplied to a predetermined stocker by the subsidiary parts supply unit based on information on the subsidiary parts in the stockers of the respective assembly stations of the operation information processing device.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
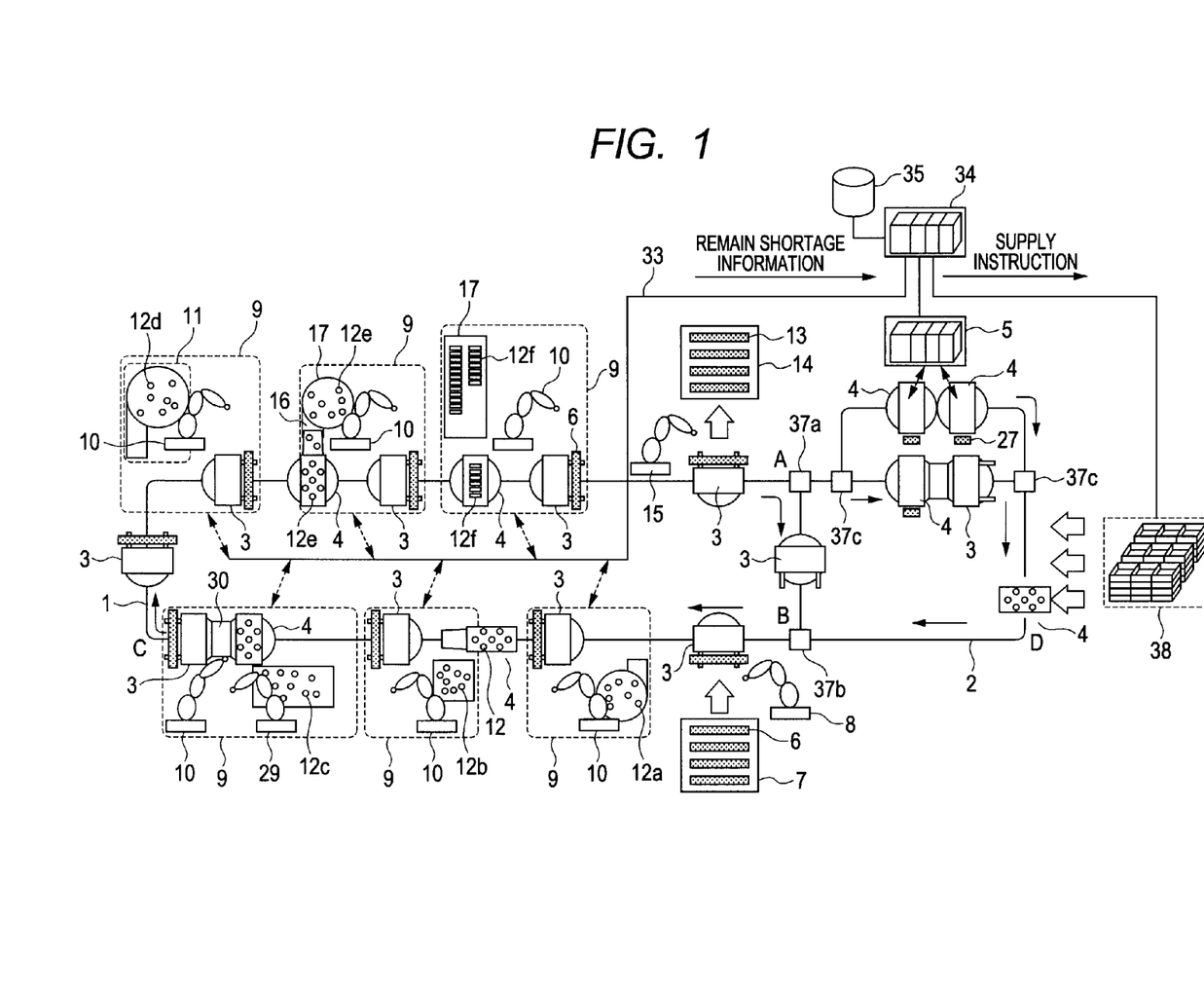
FIG. 1 is an exemplary diagram illustrating a parts assembly system in an automatic production line according to the present invention.

As shown in FIG. 1, the present embodiment is a parts assembly system including a main conveying path (a first conveying path) 1, which performs both parts conveyance and assembly, and a parts placing path (a second conveying path) 2 which branches from or joins the main conveying path 1. A main parts conveying cart 3, having a positioning function for parts assembly, and a subsidiary parts conveying cart 4, which loads parts to be assembled and coveys the parts to each assembly step, travel along the main conveying path (the first conveying path) 1 independently of each other, and operations thereof are controlled by using wireless communication from a conveying cart control device 5. The main parts conveying cart 3 travels along the main conveying path (the first conveying path) 1 in order of A, B, C and A, and the subsidiary parts conveying cart 4 travels along the main conveying path (the first conveying path) 1 and the parts placing path (the second conveying path) 2 in order of A, D, B, C and A.

In the present embodiment, main parts 6 of plastic products are placed one by one from a parts tray 7 into the main parts conveying cart 3 by a main parts placing robot 8. The main parts 6 are conveyed through the main conveying path 1 by the main parts conveying cart 3. The main conveying path 1 sequentially passes through a plurality of assembly stations 9. In each of the assembly stations 9, an assembly robot 10 takes subsidiary parts 12a to 12f (12) from a parts supply machine 11 and assembles the subsidiary parts with the main parts 6. Completed parts 13 to which the subsidiary parts 12 have completely been attached are discharged to a completed parts tray 14 by a main parts discharge robot 15.

Figure 2:
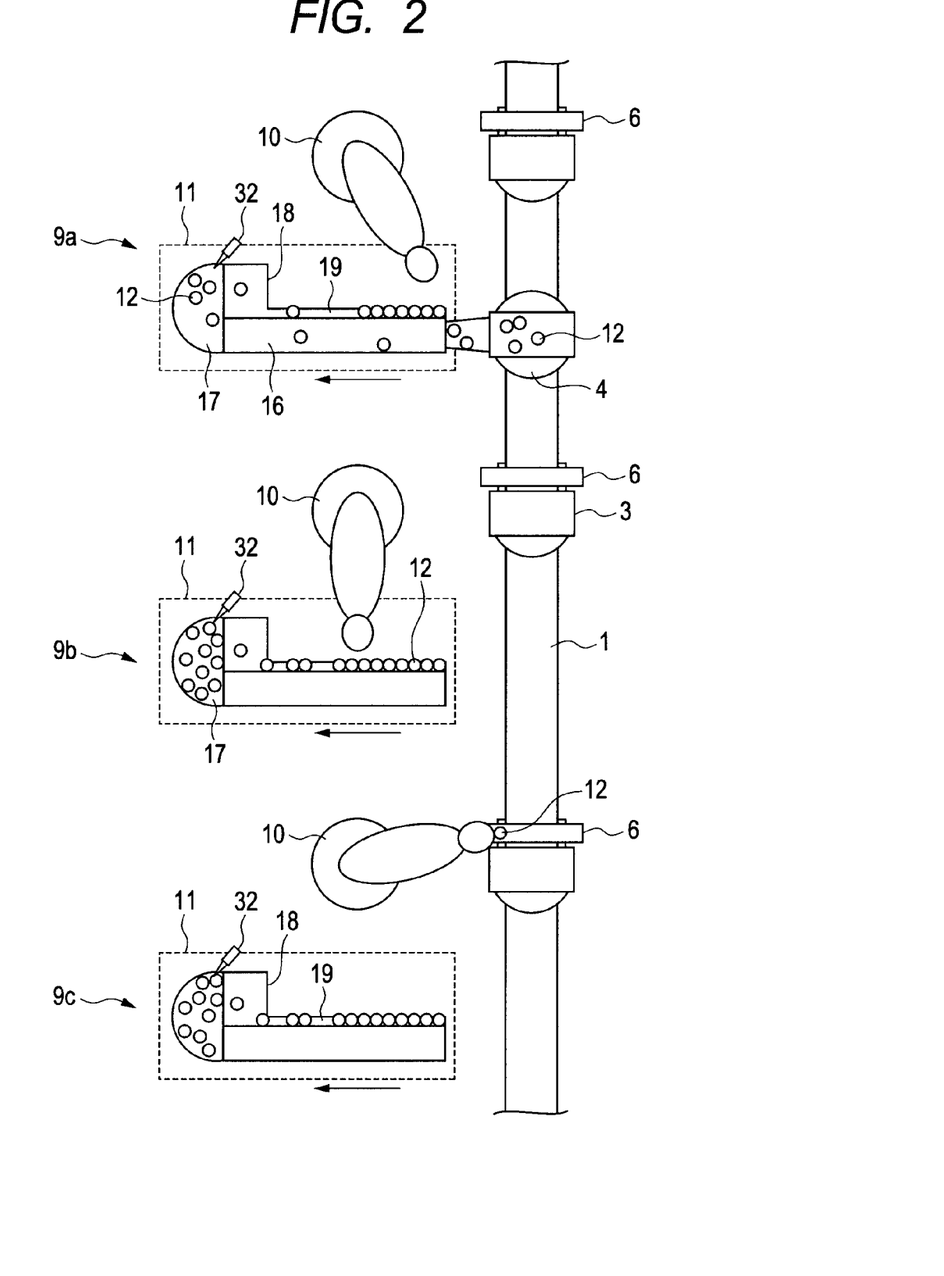
FIG. 2 is an exemplary diagram illustrating a relationship between a main conveying path and a parts supply machine.

There will be described, for example, a case where the parts supply machines 11 of assembly stations 9a to 9c are arranged adjacently to the main conveying path 1 as illustrated in FIG. 2. The subsidiary parts 12 have various shapes for the main parts 6. The assembly station 9a shows a behavior during supplement of the subsidiary parts 12, and the subsidiary parts 12 are supplemented from the subsidiary parts conveying cart 4 to a stocker 17 through a supplement chute 16. Moreover, the assembly stations 9b and 9c show a behavior during the assembly. In order to attach the subsidiary parts 12 to the main parts 6 within a short time, the parts supply machine 11 includes an alignment unit 18 for aligning directions of the subsidiary parts 12 and a feeder 19 for arranging side by side the subsidiary parts 12 along a single line to convey the subsidiary parts to the vicinity of the assembly robot 10. The subsidiary parts 12 are taken by the assembly robot 10 and attached to the main parts 6.

Figure 3:
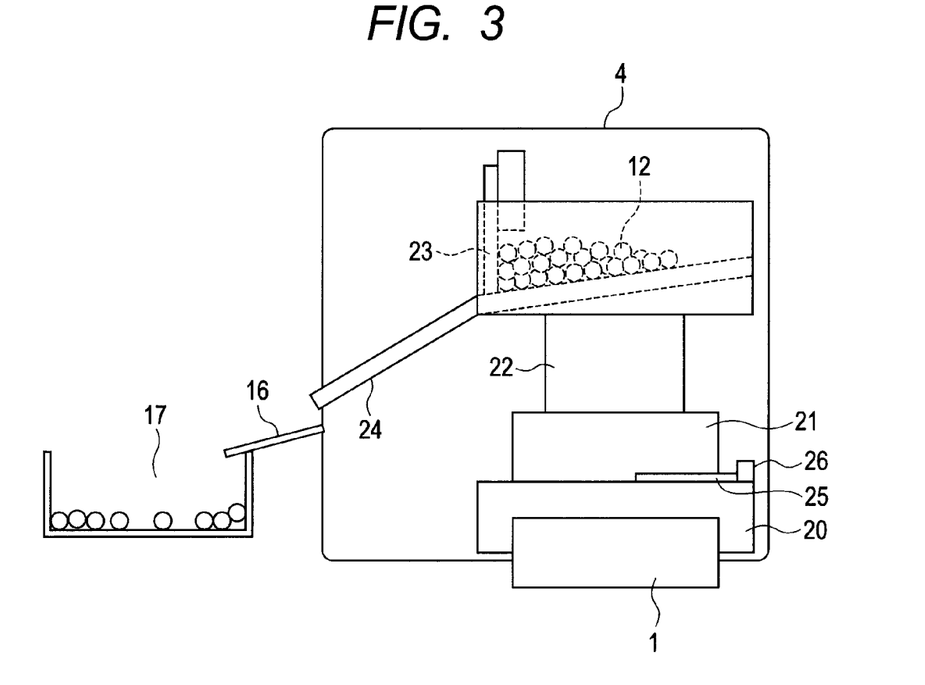
FIG. 3 is an exemplary diagram illustrating a transfer unit for supplying subsidiary parts to a stocker.

A mechanism illustrated in FIG. 3 is an example of a transfer unit which transfers the subsidiary parts 12 to the stocker 17. The subsidiary parts conveying cart 4 includes a base 20 which travels along the conveying path, a rotary shaft 21 for changing a parts placing direction, a vertical shaft 22 for changing a placing height, a shutter 23 which opens and closes when the parts are placed, and a slide 24 for connecting the supplement chute 16 on a stocker side. The subsidiary parts conveying cart 4 is not connected to a power line, and hence the cart internally includes a battery 25 and a power supply unit 26 which charges the battery 25. When the subsidiary parts conveying cart 4 is disposed adjacent to the parts supply machine 11, the rotary shaft 21 and the vertical shaft 22 are driven to adjust the position of the slide 24 to the stocker 17, the shutter 23 is then opened, and the subsidiary parts 12 are supplemented to the stocker 17. Moreover, the battery 25 is charged to prevent battery shutoff.

Figure 4:
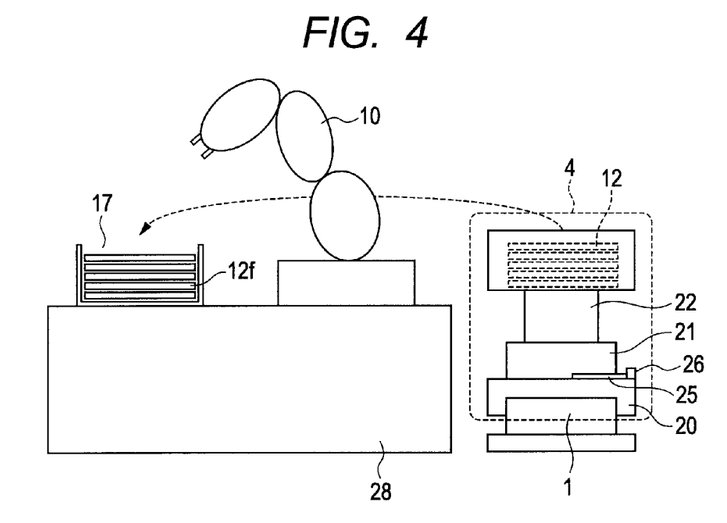
FIG. 4 is a schematic diagram illustrating a case where an assembly robot is used to supply the subsidiary parts from a subsidiary parts conveying cart to the stocker.

As another example of a parts supplementing method, FIG. 4 illustrates an example in which the assembly robot 10 is also used as a transfer unit of the subsidiary parts 12. Some of the subsidiary parts 12 have shapes or materials which are not suitable for the supplement by the supplement chute 16. In this case, the assembly robot 10 performs the supplement to the stocker 17 disposed on a trestle 28. In a case where a production rate is influenced when the assembly robot 10 performs the supplement, a supply robot 29 illustrated in FIG. 1 is separately prepared to perform a supplement operation.

Figure 5:
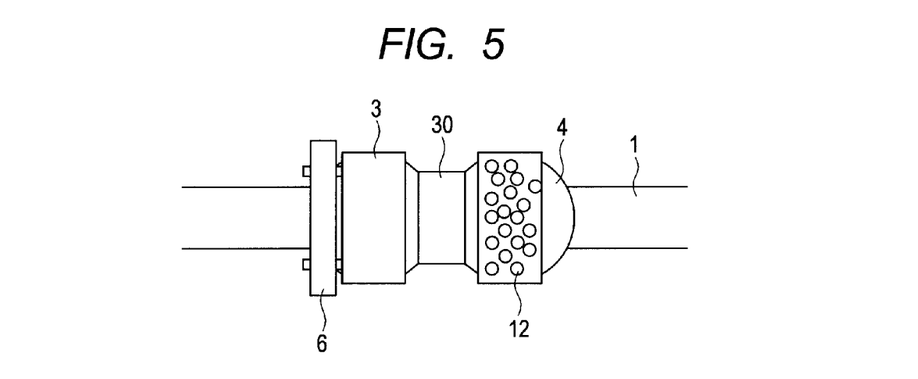
FIG. 5 is a schematic diagram illustrating a constitution where a main parts conveying cart and a subsidiary parts conveying cart are interconnected.

FIG. 5 illustrates a case where there is used an interconnecting portion 30 which interconnects the main parts conveying cart 3 and the subsidiary parts conveying cart 4. By sharing a drive unit by both the carts, control for preventing collision between the carts is not necessary.

Figure 6:
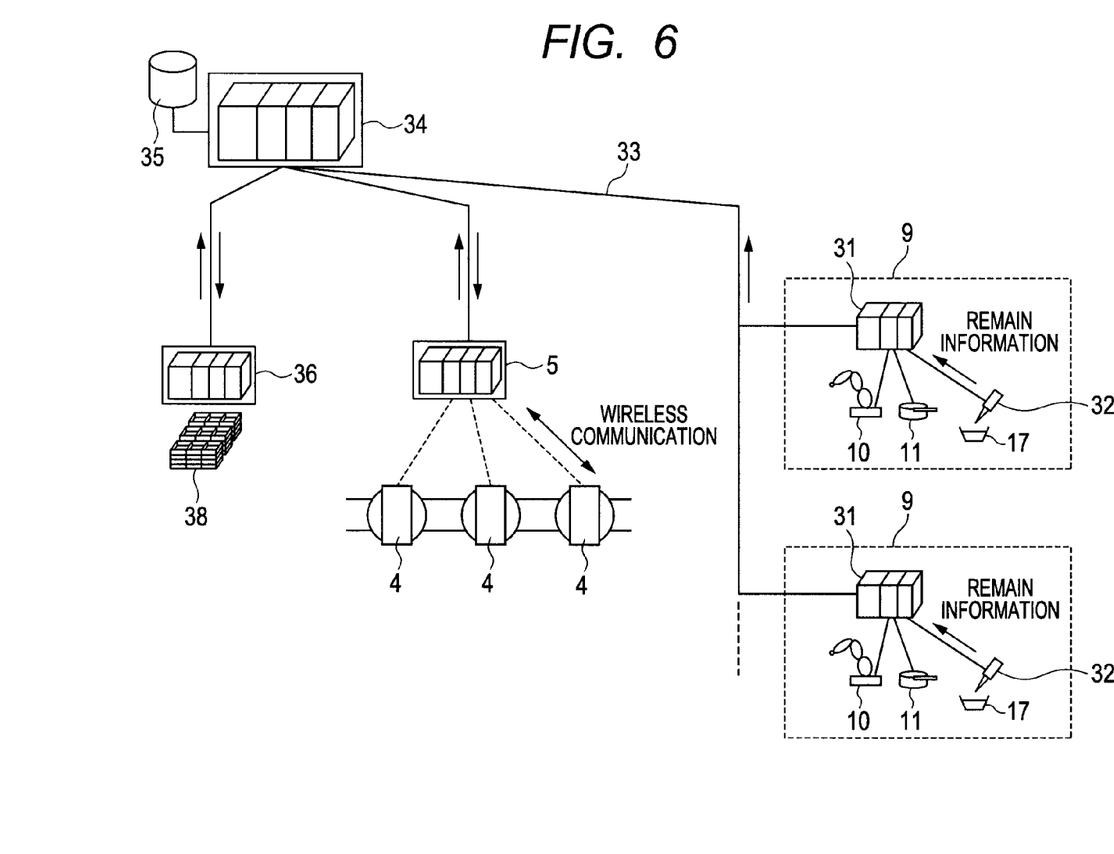
FIG. 6 is a diagram illustrating a control system which performs parts remain management in a subsidiary parts supply system.

Next, the parts supply system will be described with reference to FIG. 6. The single assembly station 9 including the parts supply machine 11 and the assembly robot 10 is allocated to a single type of the subsidiary parts 1. A station controller 31 is used to control the operation of the parts supply machine 11 and an assembly operation of the subsidiary parts with the main parts.

The stockers 17 of the respective assembly stations 9 are provided with remain sensors 32 for detecting an amount of remaining subsidiary parts. If shortage of the remaining amount of the subsidiary parts in the stocker is detected, information thereon (subsidiary parts information) is taken into the station controller 31. The station controller 31 generates information on the numbers of the assembly stations 9 and the parts remain shortage, and transmits the information to an operation information network 33. An operation information processing device 34 is connected to an operation information database 35. On receiving the received information on the parts remain shortage, the processing device writes the information in the operation information database 35, and instructs the conveying cart control device 5 to supply the subsidiary parts. At the same time, the processing device notifies a parts storage control device 36 of the parts to be placed. The conveying cart control device 5 wirelessly communicates with the subsidiary parts conveying cart 4 and performs control in accordance with a current position and an operation state.

Figure 7A:
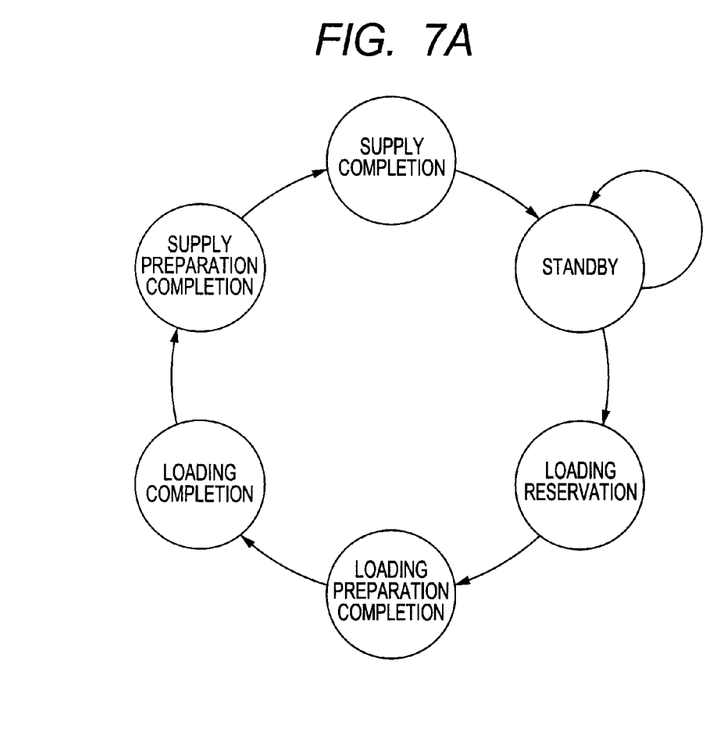
FIGS. 7A and 7B are exemplary diagrams explaining control of the subsidiary parts conveying cart.

A control method of the subsidiary parts conveying cart 4 will be described with reference to FIGS. 7A to 8B. FIG. 7A is a state transition diagram of the subsidiary parts conveying cart 4 in a case where the main parts conveying cart 3 and the subsidiary parts conveying cart 4 are not interconnected. FIG. 8A illustrates a processing flow in the parts supply system of FIG. 7A.

In a case where the subsidiary parts conveying cart 4 which does not include the interconnecting portion 30 is used, conveying path switches 37a, 37b and 37c are provided as illustrated in FIG. 1 to switch the conveying path between the main parts conveying cart 3 and the subsidiary parts conveying cart 4. The conveying path switch 37a branches the subsidiary parts conveying cart 4 to the parts placing path 2, and the conveying path switch 37b allows the subsidiary parts conveying cart 4 to join the main conveying path 1.

The subsidiary parts conveying cart 4 has a "standby" state for the branching by the conveying path switch 37c in the parts placing path 2. When the parts remain shortage of each of the stockers 17 is detected by the sensor (S01 to S03) and the conveying cart control device 5 receives a subsidiary parts supply instruction (S04), the conveying cart control device 5 searches for the chart having the "standby" state (S05). If the cart having the "standby" state is not found, the search is continued until the cart is detected. If the cart having the "standby" state is found, the cart state is changed from "standby" to "loading reservation" (S06), and the cart moves to the front of a central parts storage 38 which is a parts supply unit. When the movement is completed, the state is changed to "loading preparation completion". On confirming the cart having the "loading preparation completion" state, the parts storage control device 36 loads a type of the subsidiary parts instructed from the operation information processing device 34 onto the subsidiary parts conveying cart 4 from the central parts storage 38 as much as an instructed quantity. When the loading is completed (S07), the cart state is changed to "loading completion". The subsidiary parts conveying cart 4 on which the subsidiary parts have been loaded joins the main conveying path 1 from the parts placing path 2 through the conveying path switch 37b.

Each of the subsidiary parts conveying carts 4 includes an encoder, and can identify the information on the current position. The cart control is wirelessly performed by the conveying cart control device 5. When the subsidiary parts conveying cart 4 arrives at the front of the assembly station 9 as instructed (S08), a supply preparation completion signal is output. After receiving a preparation completion acknowledgement signal from the assembly station 9, the parts supply operation from the subsidiary parts conveying cart 4 is performed (S09) if the subsidiary parts are supplied by the method described with reference to FIG. 3. When the operation is completed, the cart state becomes a "supply completion" state (S10). Moreover, if the subsidiary parts are supplied by the method of FIG. 4, the subsidiary parts conveying cart 4 stands by until the subsidiary parts are completely obtained. After the completion signal is received from the assembly station 9, the cart state becomes a "supply completion" state. Afterward, the subsidiary parts conveying cart 4 moves to the parts placing path 2, thereby returning to the "standby" state (S11).

Figure 7B:
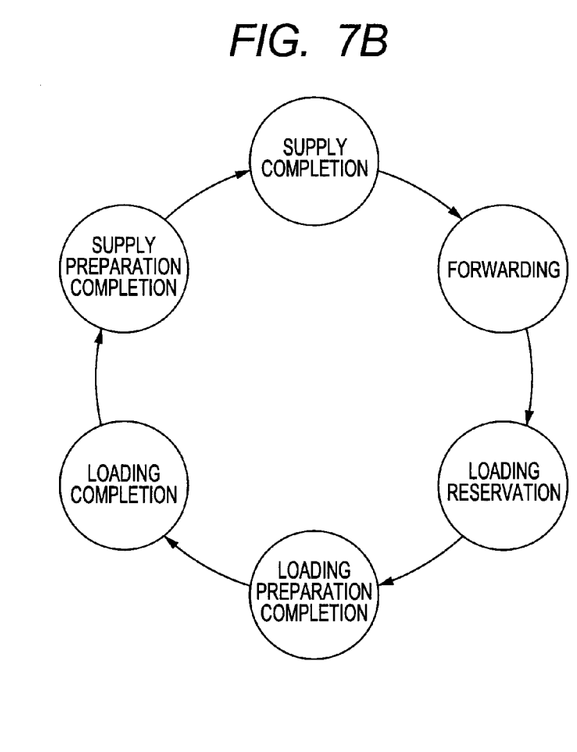
Figure 8A:
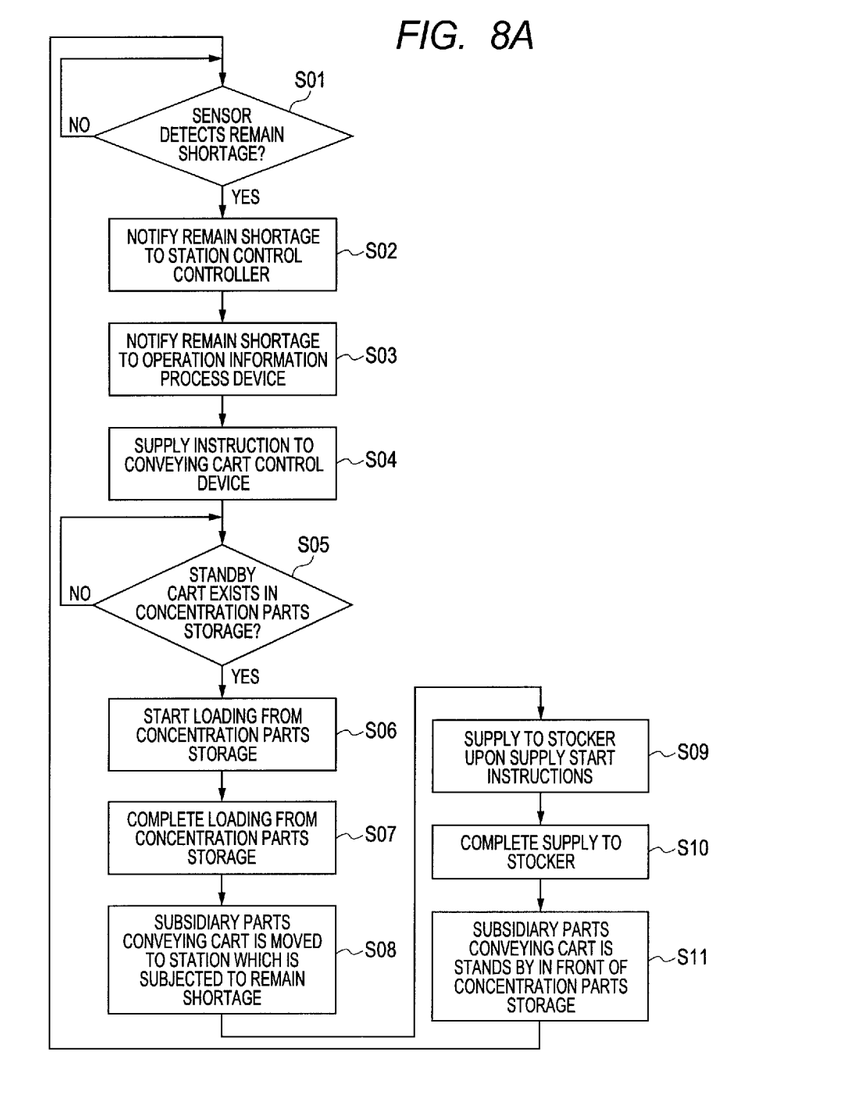
FIGS. 8A and 8B are flowcharts illustrating a parts supply step.
Figure 8B:
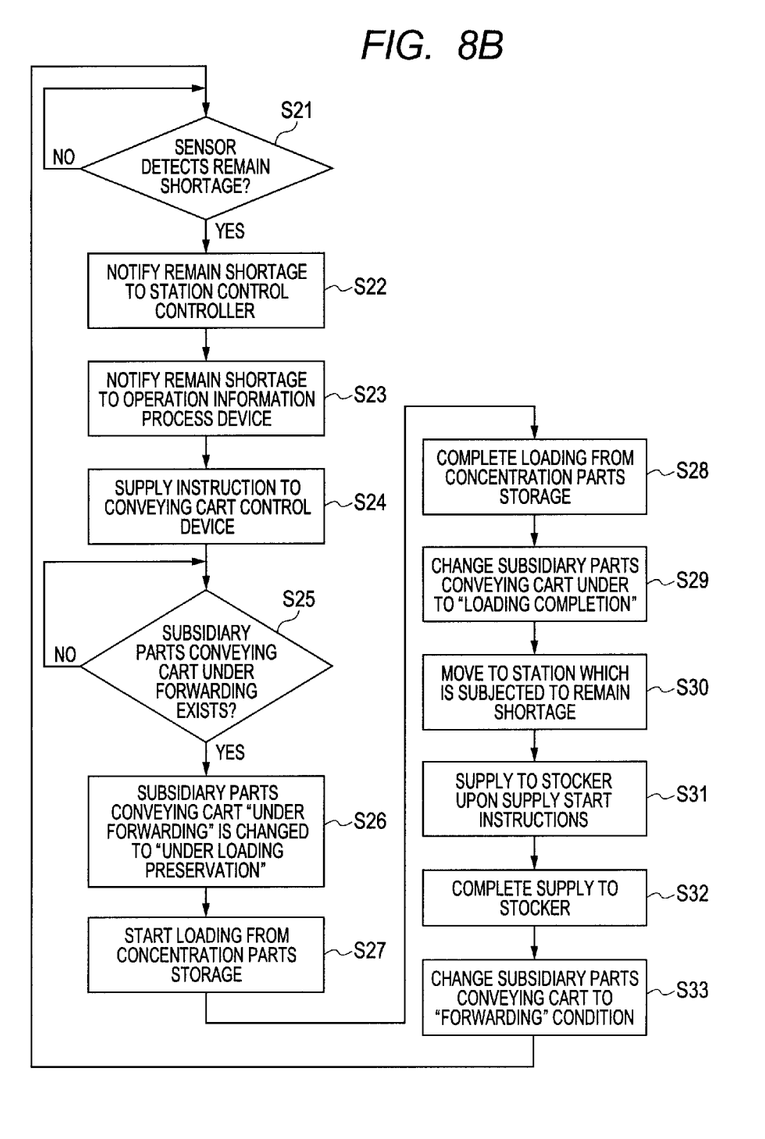

Meanwhile, in a case where the main parts conveying cart 3 and the subsidiary parts conveying cart 4 are interconnected as illustrated in FIG. 5, the state transition illustrated in FIG. 7B and the processing flow illustrated in FIG. 8B are applied. When the conveying cart control device 5 receives the subsidiary parts supply instruction (S21 to S24), the subsidiary parts conveying cart 4 having a "forwarding" state is searched. If a plurality of subsidiary parts conveying carts 4 having the "forwarding" state are detected (S25), the subsidiary parts conveying cart which is nearest to the central parts storage 38 is selected, and the cart state is changed to "loading reservation" (S26). When the movement of the cart to the front of the central parts storage 38 is completed, the state is changed to "loading preparation completion", and the subsidiary parts are loaded from the central parts storage 38 (S27). When the subsidiary parts are loaded (S28) and the subsidiary parts conveying cart 4 having the "loading completion" state (S29) arrives at the front of the assembly station 9 corresponding to a supply object (S30), the cart state becomes a "supply preparation completion" state. The signal exchange when the subsidiary parts are placed into the parts supply machine 11 is similar to that when the main parts conveying cart 3 and the subsidiary parts conveying cart 4 are not interconnected. After the cart state changes to the "supply completion" state, the cart state returns to the "forwarding" state if the assembly operation simultaneously performed is completed (S31 to S33).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-254482, filed Nov. 15, 2010, which is hereby incorporated by reference herein in its entirety.

What is claimed is:

1. A parts assembly system which assembles a subsidiary part with a main part, comprising:
    a first conveying path;
    a plurality of assembly stations arranged along the first conveying path, at least one of the plurality of assembly stations having a stocker and an assembly robot;
    a first main part conveying cart and a second main part conveying cart sequentially passing through the plurality of assembly stations on the first conveying path, each of the first main part conveying cart and second main part conveying cart mounting a main part; and
    a subsidiary parts conveying cart movable between the first main part conveying cart and the second main part conveying cart on the first conveying path, the subsidiary parts conveying cart mounting a plurality of subsidiary parts, and the mounted subsidiary parts being moved to the stocker by a transfer unit,
    wherein the assembly robot attaches at least one of the plurality of subsidiary parts transferred to the stocker to the main part mounted on one of the main part conveying carts on the first conveying path.

2. The parts assembly system according to claim 1, further comprising a second conveying path branched from the first conveying path, wherein the subsidiary parts are supplied through the second conveying path and conveyed to the first conveying path.

3. The parts assembly system according to claim 1, wherein the transfer unit is arranged in the subsidiary parts conveying cart.

4. The parts assembly system according to claim 1, further comprising an interconnecting portion which interconnects one of the main part conveying carts and the subsidiary parts conveying cart.

5. The parts assembly system according to claim 1, wherein the main part conveying carts include positioning means.

6. The parts assembly system according to claim 1, wherein the transfer unit includes a rotary shaft, a vertical shaft, a shutter, and a slide.

7. The parts assembly system according to claim 1, wherein the transfer unit is the assembly robot.

8. The parts assembly system according to claim 1, wherein the stocker includes a sensor for detecting a remaining amount of the subsidiary parts, the subsidiary parts being supplied to the subsidiary parts conveying cart on a second conveying path by a signal from the sensor.

9. A part manufactured by the parts assembly system according to claim 1.

* * * * *